United States Patent
Kitsunai et al.

(10) Patent No.: US 8,613,374 B2
(45) Date of Patent: Dec. 24, 2013

(54) CAST PART MADE OF ALUMINUM ALLOY, FUEL TANK, AND PRODUCTION METHOD FOR THE SAME

(75) Inventors: Toru Kitsunai, Shizuoka (JP); Atsushi Hirose, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1313 days.

(21) Appl. No.: 11/562,025

(22) Filed: Nov. 21, 2006

(65) Prior Publication Data

US 2009/0250476 A1 Oct. 8, 2009

(30) Foreign Application Priority Data

Nov. 22, 2005 (JP) ................. 2005-336680

(51) Int. Cl.
*B65D 1/00* (2006.01)
*C22F 1/04* (2006.01)

(52) U.S. Cl.
USPC ........... 220/660; 148/549; 148/537; 148/523; 148/437; 220/567.2

(58) Field of Classification Search
USPC ........ 148/437, 523, 537, 549; 220/567.2, 660
See application file for complete search history.

(56) References Cited

U.S. PATENT DOCUMENTS

| 4,797,327 | A * | 1/1989 | Honda et al. | 428/600 |
| 6,420,052 | B1 * | 7/2002 | Keeney et al. | 428/621 |
| 2006/0108369 | A1 | 5/2006 | Hirose et al. | |

FOREIGN PATENT DOCUMENTS

| EP | 1659054 A2 | 5/2006 |
| JP | 57-207162 A | 12/1982 |
| JP | 08-232789 A | 9/1996 |
| JP | 09-3610 A | 1/1997 |
| JP | 11-059539 A | 3/1999 |
| JP | 11-310842 A | 11/1999 |
| JP | 2002-339030 A | 11/2002 |
| JP | 2003-011872 A | 1/2003 |
| JP | 2003-147470 A | 5/2003 |
| JP | 2005-047334 A | 2/2005 |

OTHER PUBLICATIONS

Official communication issued in the counterpart European Application No. 06024054.6, mailed on May 2, 2007.
Aluminium Rheinfelden GMBH: "Castasil-37 ALSi9Mn" Huttenaluminium Gusslegierungen, [Online], Aug. 2004, pp. 1-8, XP002429053. URL: www.alurheinfelden.com/pdf/veroeffort.
Atsushi Hirose et al.; "Motorcycle Fuel Tank"; U.S. Appl. No. 11/274,012, filed Nov. 15, 2005.
Official communication issued in counterpart European Application No. 08013797.9, mailed on Nov. 5, 2008.
"Hüttenaluminium Gußlegierungen," Aluminium Rheinfelden Kataloge; XP 002498284; www.alurheinfelden.com/pdf/katalog/H%FCttenaluminiumGusslegierungen_05.pdf>; May 2003; pp. 1-88.

(Continued)

*Primary Examiner* — Rebecca Lee
(74) *Attorney, Agent, or Firm* — Keating & Bennett, LLP (57) ABSTRACT

A fuel tank for a vehicle is made of a cast aluminum alloy and has good ductility and toughness. The cast aluminum alloy is subjected to a heat treatment at a temperature of no less than about 350° C. and no more than about 390° C. to possess a Vickers hardness of about 70 HV or less.

8 Claims, 4 Drawing Sheets

(56) References Cited

OTHER PUBLICATIONS

Chattopadhyay et al.: "On the Formation of V-Phase in Mechanically Alloyed AlSiMg-SiCp Metal Matrix Composites With Trace Scandium Additions," Materials Science and Engineering; vol. 333; XP002498283; Jun. 13, 2002; pp. 67-71.

Official Communication issued in corresponding Japanese Patent Application No. 2006-313899, mailed on Oct. 25, 2011.
Suzuki, "Compositions and Properties of Aluminum", Japan Institute of Light Metals, 40th Anniversary Business Planning Committee, Commemorative Publication Group, Nov. 30, 1991, pp. 518-521.

* cited by examiner

CAST PART MADE OF ALUMINUM ALLOY, FUEL TANK, AND PRODUCTION METHOD FOR THE SAME

BACKGROUND OF THE INVENTION

1. Field of the Invention

The present invention relates to a cast part which is made of an aluminum alloy, and in particular, to a fuel tank which is made of an aluminum alloy.

2. Description of the Related Art

One important factor in improving the mileage and running properties of motorcycles and four-wheeled vehicles is to achieve light-weight bodies. Light-weight motorcycles and four-wheeled vehicles may be achieved by forming their component elements by using light-weight materials. Conventionally, many component elements, including the frame and chassis, have been formed of iron or steel containing iron. On the other hand, proposals have been made in the recent years to use aluminum (which has a smaller specific gravity than that of iron) as a structural material. Since aluminum has a density which is about ⅓ of that of iron, use of aluminum or aluminum alloys as the materials for component elements is considered to achieve a substantial reduction in the mass of a motorcycle or four-wheeled vehicle.

Japanese Laid-Open Patent Publication No. 8-232789 discloses a fuel tank for an automobile, which is made of aluminum or an aluminum alloy. This fuel tank includes an upper box member and a lower box member which are formed via drawing, which are then subjected to brazing to form a box-shaped closed space.

When producing such an aluminum or aluminum alloy part, press forming may be used to prepare aluminum or aluminum alloy plates as necessary, and these plates may be welded together to make a part with a desired shape. However, use of plates has a problem in that a plurality of plates must be prepared for the part, thus resulting in an increased number of plates. Moreover, the plates must be joined at many places and aluminum is generally more difficult to weld than steel. This illustrates the problem of high production costs when making an aluminum or aluminum alloy part from plates.

In order to solve such problems, it may be possible to use casting to form the part. However, casting requires a good melt flow, which imposes constraints on the aluminum composition for making the part. Specifically, in order to use casting to form a part with an aluminum alloy, it is necessary to add a predetermined amount of silicon to aluminum in order to achieve a good melt flow. However, the addition of silicon decreases the ductility and toughness of the part which is produced through casting. This is especially problematic in a fuel tank for a motorcycle due to the following reasons. A fuel tank for a motorcycle is often exposed to the exterior of the motorcycle, and therefore in case of falling, etc., the fuel tank is likely to receive a considerable impact. Therefore, a fuel tank for a motorcycle is required to have good ductility and toughness so as not to have any fissures or cracks after application of a considerable impact, which may allow the fuel inside the tank to leak therethrough.

As methods of adjusting the hardness of a metal member without changing its composition, heat treatments such as quenching and annealing have long been known. For example, Japanese Laid-Open Patent Publication No. 9-3610 discloses improving ductility by performing a heat treatment for an aluminum die-cast article that contains silicon. However, according to the studies of the inventors of the present application, it has been found that, in such a heat treatment, age hardening significantly affects the physical properties of the die-cast article which has been subjected to the heat treatment.

SUMMARY OF THE INVENTION

In order to overcome the problems described above, preferred embodiments of the present invention provide a cast part, for example, a fuel tank for a vehicle, which is made of an aluminum alloy and has good ductility and toughness.

A cast part according to a preferred embodiment of the present invention is a cast part made of an aluminum alloy, having a Vickers hardness of about 70 HV or less.

In a preferred embodiment, the aluminum alloy contains no less than about 5 wt % and no more than about 13 wt % of silicon.

In a preferred embodiment, the aluminum alloy contains no less than about 7.5 wt % and no more than about 13 wt % of silicon.

In a preferred embodiment, the cast part is subjected to a heat treatment at a temperature of no less than about 350° C. and no more than about 390° C.

A fuel tank according to another preferred embodiment of the present invention is a fuel tank made of a cast aluminum alloy, wherein the cast aluminum alloy has a Vickers hardness of about 70 HV or less.

In a preferred embodiment, the cast aluminum alloy contains no less than about 5 wt % and no more than about 13 wt % of silicon.

In a preferred embodiment, the cast aluminum alloy contains no less than about 7.5 wt % and no more than about 13 wt % of silicon.

In a preferred embodiment, the fuel tank includes a first member and a second member, wherein each of the first member and the second member is made of the cast aluminum alloy.

In a preferred embodiment, the first member and the second member are joined together to define a space for retaining fuel.

In a preferred embodiment, the first member and the second member are each made of an aluminum alloy which is cast by high vacuum die-cast technique, and are joined together via welding.

In a preferred embodiment, at least a portion of the fuel tank has a thickness of about 2.4 mm or less.

In a preferred embodiment, the fuel tank is subjected to a heat treatment at a temperature of no less than about 350° C. and no more than about 390° C.

In a preferred embodiment, the fuel tank includes a member made of the cast aluminum alloy, and a coating which covers a surface of at least a portion of the member and which has been hardened at a temperature of no less than about 145° C. and no more than about 200° C.

A transportation apparatus according to another preferred embodiment of the present invention includes any of the aforementioned fuel tanks.

A production method for a cast part according to another preferred embodiment of the present invention includes the steps of casting an aluminum alloy to form a cast part, and subjecting the cast part to a heat treatment so that the cast part has a Vickers hardness of about 70 HV or less.

In a preferred embodiment, the heat treatment step includes maintaining the cast part at a temperature of no less than about 350° C. and no more than about 390° C. for about 1 hour or more.

In a preferred embodiment, the aluminum alloy contains no less than about 5 wt % and no more than about 13 wt % of silicon.

A production method for a fuel tank includes the steps of casting an aluminum alloy to form a first member and a second member which together define a space for retaining fuel, and subjecting the first member and the second member to a heat treatment so that the first member and the second member each have a Vickers hardness of about 70 HV or less.

In a preferred embodiment, the heat treatment step includes maintaining the first member and the second member at a temperature of no less than about 350° C. and no more than about 390° C. for about 1 hour or more.

In a preferred embodiment, the production method for the fuel tank further includes a step, before the heat treatment step, of joining the first member and the second member together.

In a preferred embodiment, the production method for the fuel tank further includes a step, after the heat treatment step, of joining the first member and the second member together.

In a preferred embodiment, the first member and the second member are cast by a high vacuum die-cast technique, and the first member and the second member are joined together via welding.

In a preferred embodiment, the aluminum alloy contains no less than about 5 wt % and no more than about 13 wt % of silicon.

In accordance with the fuel tank of the above preferred embodiments of the present invention, which is made of a cast aluminum alloy, the number of parts defining the fuel tank can be reduced, and the length over which the parts are joined can be reduced. Furthermore, since the fuel tank has a hardness of about 70 HV or less, it has good deformability such that fissures and cracks are unlikely to occur upon impact, and age hardening is not likely to occur. Therefore, sufficient deformability can be maintained for long periods of time. Thus, the fuel tank can be suitably used especially as a fuel tank for a saddle vehicle such as a motorcycle, which is likely to receive a considerable impact upon falling, etc.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

The inventors of the present application have studied necessary aluminum alloy compositions and physical properties for producing an aluminum alloy cast part with good toughness and ductility, in particular a fuel tank which will not have any fissures upon receiving an impact. In order to ensure that a member of the fuel tank will have no fissures upon receiving an impact, it is necessary that the member has good toughness and ductility such that it is capable of deforming without fissures or cracks. Hereinafter, good toughness and ductility may collectively be referred to as "good deformability." The inventors have discovered that measurements can be relatively facilitated by using hardness (Vickers hardness) as an index for evaluating deformability, which in turn will enable correct evaluation of the level of deformability.

Figure 1:
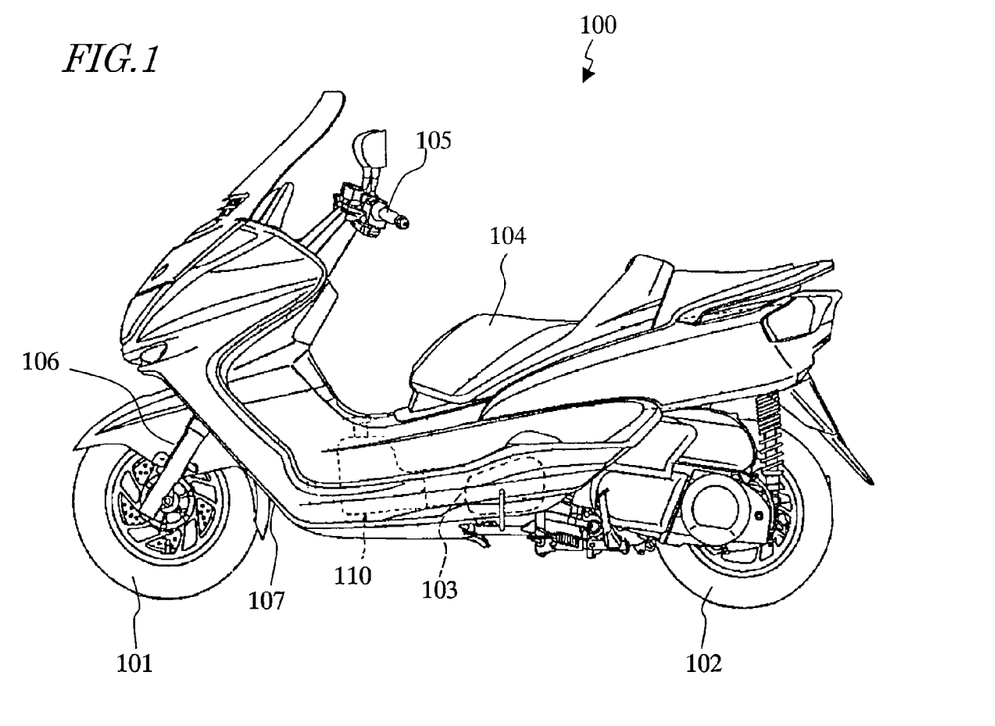
FIG. 1 is a side view showing a motorcycle which includes a fuel tank according to a preferred embodiment of the present invention.

Moreover, it has been discovered that, when improving ductility by performing a heat treatment for an aluminum die-cast article which contains silicon, age hardening significantly affects the physical properties of the die-cast article which has been subjected to heat treatment. By also taking age hardening into consideration, the inventors have arrived at a cast part which has optimum characteristics for a fuel tank. Hereinafter, a fuel tank for a motorcycle will be described as an example of a cast part according to a preferred embodiment of the present invention. FIG. 1 is a side view showing a motorcycle 100 which includes a fuel tank according to a preferred embodiment of the present invention. The motorcycle 100 includes a front wheel 101, a rear wheel 102, an engine 103, a seat 104, handle bars 105, a front fork 106, a cover 107, and a fuel tank 110. At one end of the front fork 106, the front wheel 101 is supported so as to be capable of rotating. The handle bars 105 are affixed to the other end of the front fork 106. The front fork 106 is affixed to a main frame (not shown) so as to be capable of pivoting. The engine 103 is supported by the main frame, and the rotary driving force from the engine 103 is transmitted to the rear wheel 102 via a chain (not shown) and the like. The fuel tank 110 is also supported by the main frame, near the engine 103. The seat 104 is also supported by the main frame. The cover 107 is arranged so as to cover the main frame, the fuel tank 110, and the engine 103.

Figure 2:
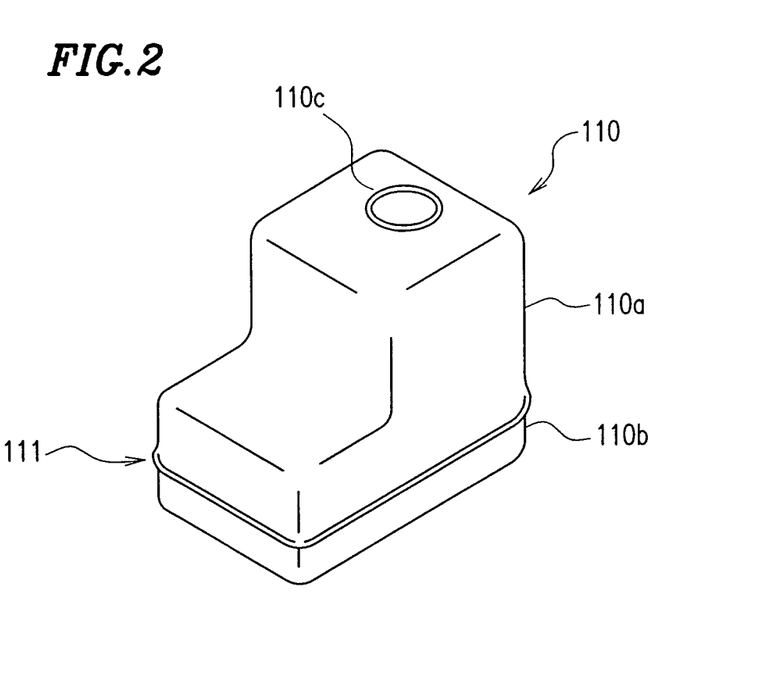
FIG. 2 is perspective view showing a preferred embodiment of a fuel tank according to the present invention.
Figure 3:
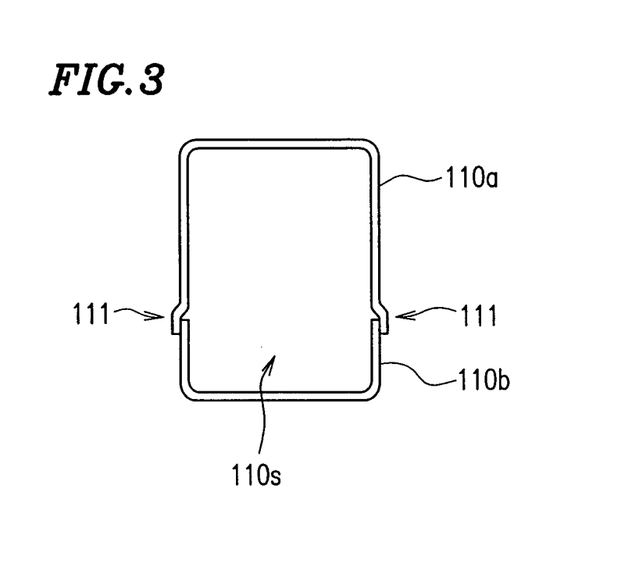
FIG. 3 is a cross-sectional view showing a preferred embodiment of a fuel tank according to the present invention.

FIG. 2 is a perspective view of the fuel tank 110, and FIG. 3 is a cross-sectional view of the fuel tank 110. As shown in FIGS. 2 and 3, the fuel tank 110 includes a first member 110a and a second member 110b. In the present preferred embodiment, the first member 110a is shaped so as to define an upper portion of an interior space 110s of the fuel tank 110, whereas the second member 110b is shaped so as to define a lower portion of the interior space 110s. Fuel is retained in the interior space 110s of the fuel tank 110. There are no particular limitations as to the shape and size of the interior space 110s, which may be arbitrarily decided depending on the purpose and the like of the motorcycle 100. For example, the interior space 110s has a volume of about 20 L. Note that the first and second members 110a and 110b do not need to define an upper portion and a lower portion of the fuel tank 110, but may define a left portion and a right portion thereof, for example.

Each of the first and second members 110a and 110b is preferably formed as an integral piece via casting. Therefore, each of the first and second members 110a and 110b must have a shape which allows itself to be taken out of the mold after casting. Depending on the shape of the overall fuel tank 110, however, merely dividing the fuel tank 110 into the first and second members 110a and 110b may not be sufficient to allow each member to be in a shape which allows casting. In such a case, the fuel tank 110 may include of three or more members. However, as the number of members increases, the members will have to be joined at an increasing number of places, thus increasing the production cost. Therefore, it is preferable to keep the number of members as small as possible.

In the present preferred embodiment, the first member 110a is shaped so as to include a generally rectangular solid portion having a flange 110c for being connected to an injection inlet through which fuel is injected into the fuel tank 110, and a relatively large rectangular solid portion having an opening. The second member 110b has a substantially rectangular solid shape with an opening. The first member 110a and the flange 110c may be integral.

The first and second members 110a and 110b can be formed by various casting methods which are used in producing aluminum alloy cast parts. In the case where a high precision shape is required, it is preferable to perform casting by a die-cast technique.

With their respective openings opposing each other, the first and second members 110a and 110b are joined to form a joint 111 around their respective side surfaces which define the openings. Brazing or welding can be used as the method of joining. As for welding, arc welding such as MIG or TIG, laser welding, electron beam welding, or the like can be used. In order to obtain sufficient mechanical strength, it is preferable to join the first and second members 110a and 110b via welding. In the case of joining via welding, the first and second members 110a and 110b are preferably cast by a high vacuum die-cast technique in order to suppress blisters (surface swelling) during the welding. In this case, it is preferable that the amount of gas contained in the first and second members 110a and 110b is about 5 cc/100 g or less.

In order to achieve a light weight, the first and second members 110a and 110b should preferably be as thin as possible. Specifically, since conventional steel fuel tanks have a thickness of about 0.8 mm and aluminum alloys have a specific gravity which is about ⅓ of that of steel, it would be necessary to reduce the thickness of at least a portion of the first and second members 110a and 110b to be about 2.4 mm or less in order to achieve a light weight. However, sufficient strength cannot be obtained with an excessively small thickness. Therefore, it is preferable that the first and second members 110a and 110b have a thickness of no less than about 1.2 mm and no more than about 2.4 mm.

The first and second members 110a and 110b are made of an aluminum alloy having a composition which allows each member to be formed via casting. Since the first and second members 110a and 110b have a small thickness, it is preferable that the first and second members 110a and 110b are made of an aluminum alloy whose composition achieves a low viscosity when melted, so that the melt will have a good melt flow. Specifically, it is preferable that the first and second members 110a and 110b are made of an aluminum alloy which contains silicon at a rate of no less than about 5 wt % and no more than about 13 wt %. If the silicon content is less than about 5 wt %, the melt flow will not be adequate, thus resulting in a poor castability. In particular, it will be difficult to form cast articles so as to have the aforementioned thickness. On the other hand, if the silicon content exceeds about 13 wt %, primary crystals of silicon will deposit on the aluminum alloy which has been cast, thus greatly reducing the ductility. In the case of forming the first and second members 110a and 110b by a die-cast technique, an even better flow is desirable, and it is preferable that the silicon content is no less than about 7 wt % and no more than about 13 wt %. As such an aluminum alloy, an Al—Si type alloy, an Al—Si—Mg type alloy, or an Al—Si—Cu type alloy can be suitably used, for example.

The first and second members 110a and 110b have a Vickers hardness (HV0.3) of about 70 HV or less. By prescribing the Vickers hardness to be about 70 HV or less, it is ensured that the first and second members 110a and 110b have a high deformability, such that fissures or cracks will be prevented from occurring upon receiving an impact. As used herein, an "impact" is defined as an impact in a strength test which complies with the impact test of SAE (Society of Automotive Engineers) J1241.

An aluminum alloy which contains silicon at the aforementioned rate usually has a Vickers hardness of about 90 HV or more. Therefore, immediately after casting, the first and second members 110a and 110b have too high a hardness and therefore a low deformability. According to the present preferred embodiment of the present invention, the first and second members 110a and 110b are subjected to a heat treatment after casting to carry out an annealing process for enhancing deformability. The annealing is performed by maintaining the first and second members 110a and 110b at a temperature of no less than about 350° C. and no more than about 390° C. for about 1 hour or more. There are no particular limitations as to the cooling rate following the heat treatment, and the first and second members 110a and 110b may be cooled gradually or rapidly. However, in order to minimize changes in the dimensions, it is preferable to effect a gradual cooling via air cooling. As a result of this, the eutectic silicon will become spherical to improve the ductility of the member, thus resulting in an enhanced deformability. After cooling, the first and second members 110a and 110b will have a hardness of about 70 HV or less.

If the retention temperature during the heat treatment is lower than about 350° C., the effects of annealing will not be sufficient, thus making it difficult for the first and second members 110a and 110b to achieve a hardness of about 70 HV or less within a practical treatment time. On the other hand, if the treatment temperature exceeds about 390° C., the hardness immediately after the heat treatment will be about 70 HV or less, but age hardening will follow thereafter to increase the hardness to be above about 70 HV. As a result, although the first and second members 110a and 110b may have a sufficient deformability immediately after the heat treatment, hardening will progress with time, thus leading to a low deformability.

As described with reference to the experimental examples below, so long as the heat treatment temperature after casting is about 390° C. or less, age hardening will not occur in the first and second members 110a and 110b even if the first and second members 110a and 110b are thereafter heated to a temperature of about 180° C. for about 30 minutes or heated to about 90° C. for about 96 hours. Therefore, even if exposed to a heat of about 180° C. for about 30 minutes, the first and second members 110a and 110b will retain a hardness of about 70 HV or less. Therefore, the first and second members 110a and 110b of the fuel tank 110 will have a hardness of about 70 HV or less not only immediately after the heat treatment, but also after spending about 7 days at room temperature following the heat treatment, or after being maintained at a temperature of about 180° C. for about 30 minutes, or at a temperature of about 90° C. for about 96 hours, after the heat treatment.

Prescribing the temperature of the heat treatment after casting to be about 390° C. or less also helps to avoid the problem that blisters may occur due to the heat treatment, and also when gas is taken into the member during casting. Thus, it is not necessary to use high vacuum die-cast technique to reduce the amount of gas which is taken into the member, in order to prevent blisters associated with the heat treatment after casting. However, as mentioned above, in the case where the first and second members 110a and 110b are joined via welding, it is preferable to cast the first and second members 110a and 110b by a high vacuum die-cast technique in order to prevent blisters during welding.

In the motorcycle 100 of the present preferred embodiment, the fuel tank 110 is disposed near the engine 103. Therefore, due to the heat from the engine, the fuel tank 110 may be heated to about 90° C. during travel. However, the fuel tank 110 is free from age hardening even in such an environment and thus maintains sufficient deformability, such that fissures or cracks are prevented even when receiving an impact.

As will be clear from the above description, the fuel tank 110 is produced by forming the first and second members 110a and 110b via casting using an aluminum alloy of the aforementioned composition, and joining together the first and second members 110a and 110b. The heat treatment for the annealing may be performed before joining the two members, or the heat treatment may be performed after the joining.

Since the fuel tank according to the preferred embodiments of the present invention is made of a cast aluminum alloy, the number of parts defining the fuel tank can be reduced, and the number of places at which the parts are joined can also be reduced. As a result, the fuel tank can be produced at low cost. Since the fuel tank has a hardness of about 70 HV or less, it has good deformability, such that fissures or cracks are not likely to occur upon impact. Furthermore, since age hardening does not occur, sufficient deformability is maintained for long periods of time. Therefore, the fuel tank can be suitably used especially as a fuel tank for a saddle vehicle such as a motorcycle, which is likely to receive a considerable impact upon falling, etc. As used herein, a "saddle vehicle" refers to any ATV on which a rider rides, e.g., a motorcycle or a buggy, a water vehicle, or the like.

Thus, according to the preferred embodiments of the present invention, it is possible to achieve, at low cost, a motorcycle including a fuel tank which is not likely to experience fuel leakage even when receiving an impact and which is also light weight. Since the fuel tank is light weight, the motorcycle according to a preferred embodiment of the present invention has excellent mileage and running properties.

Figure 4:
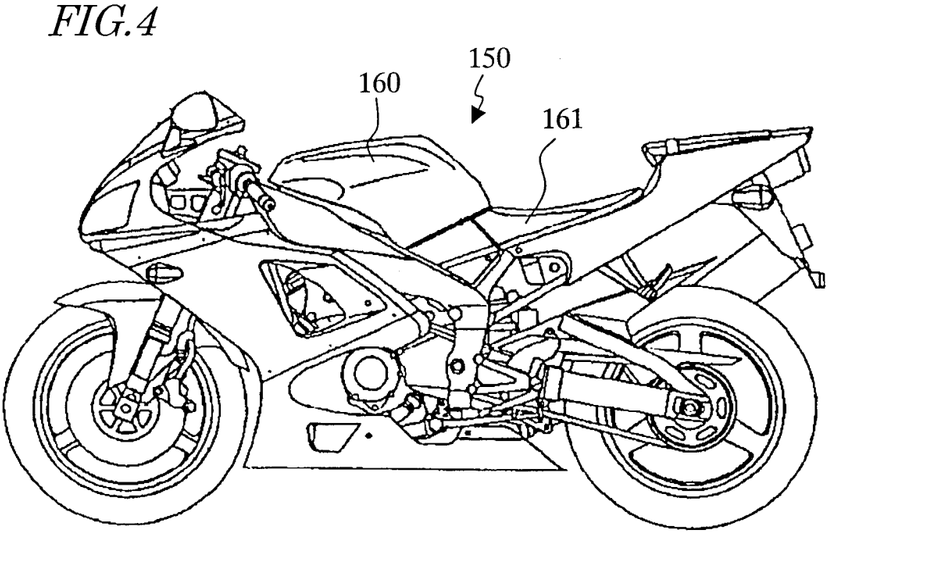
FIG. 4 is a side view showing another motorcycle which includes a fuel tank according to a preferred embodiment of the present invention.
Figure 5:
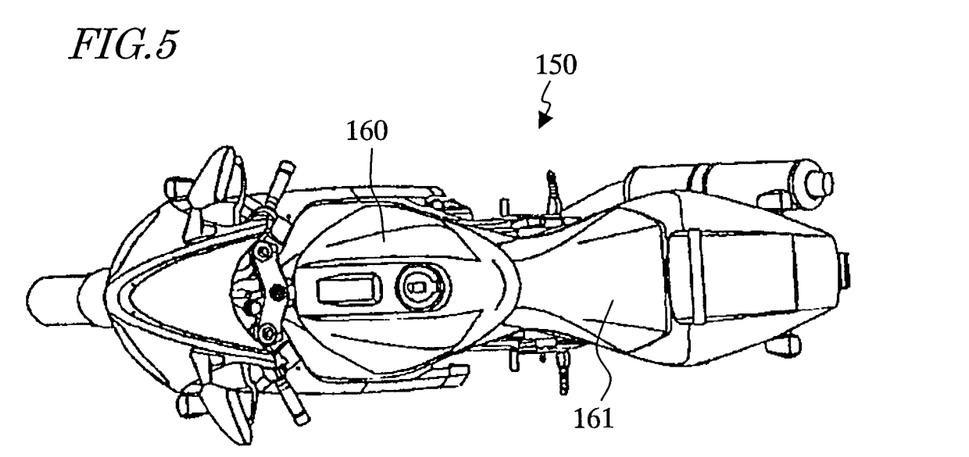
FIG. 5 is an upper plan view showing another motorcycle which includes a fuel tank according to a preferred embodiment of the present invention.

Although the above preferred embodiment illustrates a motorcycle whose fuel tank is not exposed to the exterior, the present invention is also applicable to other types of motorcycles. FIG. 4 is a side view of another type of motorcycle 150. FIG. 5 is an upper plan view of the motorcycle 150. As is clear from FIGS. 4 and 5, the motorcycle 150 is a sports-type motorcycle. The motorcycle 150 includes a fuel tank 160. The fuel tank 160 is placed in front of a seat 161, and is allowed to define a part of the exterior appearance of the motorcycle 150. Therefore, coating is provided on the surface of the portion of the fuel tank 160 that contributes to the exterior appearance of the motorcycle 150. The fuel tank 160 has a structure as specifically described above.

The coating which is provided on the portion of the fuel tank 160 that contributes to the exterior appearance is formed via bake finishing. Baking of the paint is performed at no less than about 140° C. and no more than about 200° C. As described above, the fuel tank according to the preferred embodiments of the present invention will not experience age hardening even when exposed to a heat of about 180° C. for about 30 minutes, and therefore has good deformability. Since the fuel tank 160 is exposed to the exterior of the motorcycle 150, the fuel tank 160 is likely to receive a considerable impact when the motorcycle 150 falls, etc. Even in such cases, the sufficient deformability of the fuel tank 160 prevents fissures or cracks from occurring in response to the impact, and allows the fuel tank 160 to be deformed instead. As a result, the driver seated on the seat 161 is prevented from receiving significant injury, and fuel leakage can be prevented.

A fuel tank for a motorcycle has been illustrated as a preferred embodiment of the cast part according to the present invention. However, the present invention can be suitably used for a fuel tank of any transportation apparatus that includes a fuel-based driving mechanism, e.g., a four-wheeled vehicle, and in cast parts for various purposes which are required to have good deformability and which are light-weight and thin. In particular, the present invention is suitably used for cast parts which are to be used in an environment where they are exposed to heat and are required to have sufficient deformability for long periods of time.

Hereinafter, experimental examples will be described where cast parts according to preferred embodiments of the present invention were examined with respect to heat treatment temperature, hardness, and age hardening, and were subjected to an impact test.

First, an aluminum alloy (A365 alloy) containing 10 wt % of Si, 0.5 wt % of Mn, 0.3 wt % of Mg, 100 ppm of Sr, and a complementing portion of Al as well as inevitable impurities is prepared. By using an aluminum alloy of this composition, a number of boxes were prepared via die casting, each having a wall thickness of 1.5 mm, a depth of 300 mm, a width of 200 mm, and a height of 150 mm, with one surface of each box being left open. Next, every two such boxes were subjected to MIG welding while holding them with their openings opposing each other, thus producing a number of sample tanks each enclosing an interior space. The respective sample tanks were heated to 300° C., 330° C., 350° C., 375° C., 390° C., 450° C., or 500° C. for 1 hour. Except for the sample tank which had been heated to 450° C., the sample tanks were allowed to be cooled with air (air cooling). The sample tank which had been heated to 450° C. was cooled by being immersed in water (water cooling).

Thereafter, as aging conditions, each sample tank was subjected to a process of being maintained at 180° C. for 0.5 hours ("Aging Treatment 1") as well as a process of being maintained at 90° C. for 96 hours ("Aging Treatment 2").

At each stage, the hardness of each sample tank was measured by using a micro-Vickers hardness meter. The hardness was obtained by taking a specimen out of the sample tank; after polishing a cut surface of the specimen so as to be smooth, taking hardness measurements at seven points across the cut surface; and then averaging the measurements at the five points excluding the maximum value and the minimum value.

Each sample tank after the heat treatment of Aging Treatment 2 was subjected to an impact test. The impact test was performed in the form of a drop test compliant with the impact test of SAE J1241, with water being filled in the sample tank. The level of deformation and presence of cracks of each sample tank after the drop test were observed in a comprehensive manner, and evaluated.

The hardness and impact test results of the respective sample tanks are shown in Table 1. Changes in their hardness are shown in FIG. 6.

TABLE 1

| heat treatment condition | after casting | Hardness (HV0.3) after heat treatment | after Aging Treatment 1 | after Aging Treatment 2 | Impact Test deformation | cracks | OK/NG |
|---|---|---|---|---|---|---|---|
| 300° C. | 95 | 87.2 | 82.2 | 87.3 | YES | YES | NG |
| 330° C. | 95 | 77.2 | 77.1 | 78.6 | YES | YES | NG |
| 350° C. | 95 | 69.0 | 66.4 | 67.8 | YES | NO | OK |
| 375° C. | 95 | 69.7 | 67.9 | 67.5 | YES | NO | OK |
| 390° C. | 95 | 64.8 | 63.8 | 64.3 | YES | NO | OK |
| 450° C. | 95 | 58.7 | 64.4 | 71.1 | YES | YES | NG |
| 500° C. | 95 | 58.5 | 71.5 | 74.8 | YES | YES | NG |

Figure 6:
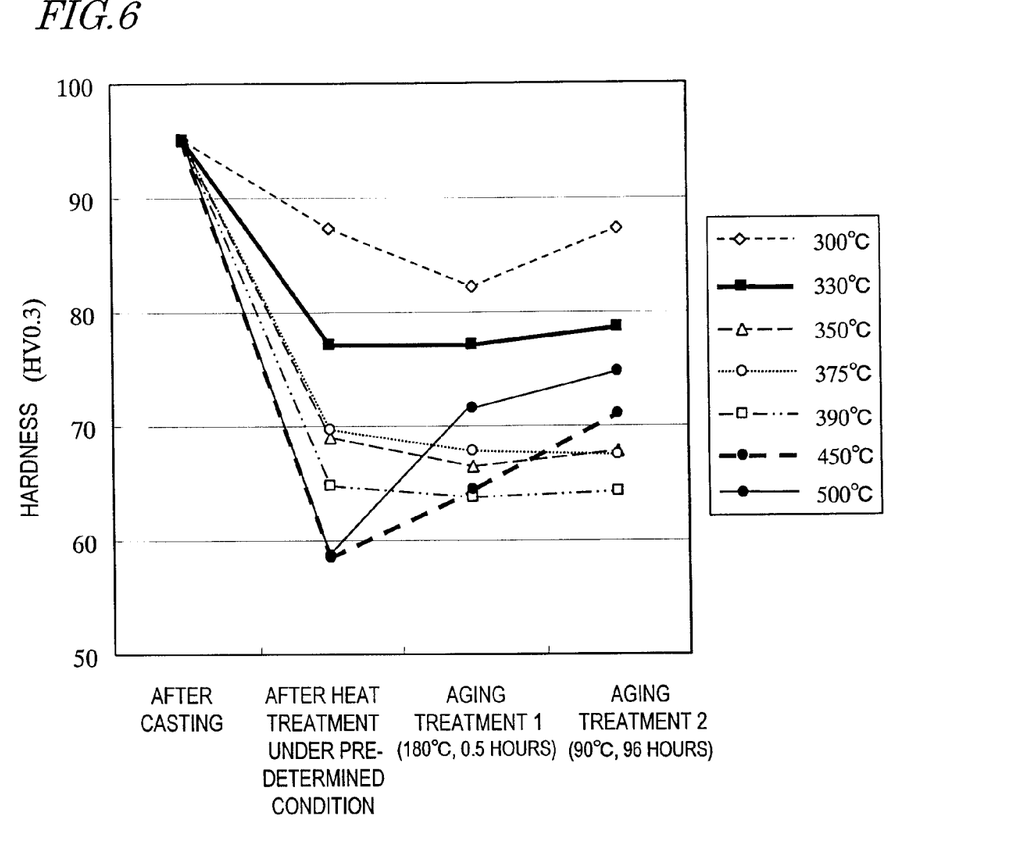
FIG. 6 is a graph showing hardness obtained when a cast aluminum alloy is subjected to heat treatment under various conditions.

As is shown in FIG. 6 and Table 1, every sample tank after casting had a hardness of 95 HV. Through a heat treatment at each predetermined temperature, the aluminum alloy was annealed to result in a lower hardness. Moreover, the hardness lowers as the temperature of the heat treatment increases. It can be seen that the heat treatment temperature needs to be about 350° C. or more in order to ensure that the sample tank has a hardness of about 70 HV or less immediately after casting.

It can be seen that a subsequent heating under the condition of Aging Treatment 1 and the condition of Aging Treatment 2 caused significant age hardening in the sample tanks subjected to a heat treatment at 450° C. or 500° C. The sample tanks subjected to a heat treatment in the range from about 330° C. to about 390° C. generally did not show hardening, and had little change in hardness. The sample tank subjected to a heat treatment at 300° C. decreased in hardness after Aging Treatment 1. This indicates that a heat treatment at 300° C. for 1 hour does not result in adequate annealing.

The sample tanks subjected to a heat treatment in the range from about 350° C. to about 390° C. did not show any cracks in the impact test, thus satisfying the impact test criteria. These sample tanks generally had a hardness of about 70 HV or less after being heated under the condition of Aging Treatment 2.

Therefore, it is presumed that a hardness of about 70 HV or less leads to a sufficient deformability such that the impact test criteria are satisfied. In order to confirm this, a sample tank which was subjected to a heat treatment at 500° C. was immediately thereafter subjected to an impact test, which showed no cracks in the tank. Thus, it is presumed that those sample tanks which are subjected to a heat treatment of 450° C. or 500° C. possess a low hardness immediately after the heat treatment such that the impact test criteria are satisfied, but thereafter will experience age hardening, as a result of which they no longer satisfy the impact test criteria.

The above results indicate that those sample tanks which are subjected to a heat treatment in the range from about 350° C. to about 390° C. have a hardness of about 70 HV or less, and do not experience age hardening even when exposed to a heat of about 180° C., thus being able to maintain the same level of hardness. Hence, they will maintain stable deformability for long periods of time.

Cast parts according to the preferred embodiments of the present invention can be suitably used as cast parts for various purposes which are required to have good deformability and which are light weight and thin, in particular as fuel tanks for vehicles.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2005-336680 filed on Nov. 22, 2005, the entire contents of which are hereby incorporated by reference.

What is claimed is:

1. A fuel tank made of a cast aluminum alloy:
the cast aluminum alloy has a Vickers hardness of 70 HV or less;
the aluminum alloy contains no less than 7.5 wt % and no more than 13 wt % of silicon; and
wherein the fuel tank has been subjected to a heat treatment at a temperature of no less than 350° C. and no more than 390° C.

2. The fuel tank of claim 1, comprising:
a member made of the cast aluminum alloy; and
a coating which covers a surface of at least a portion of the member and which has been hardened at a temperature of no less than about 145° C. and no more than about 200° C.

3. The fuel tank of claim 1, comprising a first member and a second member, wherein each of the first member and the second member is made of the cast aluminum alloy.

4. The fuel tank of claim 3, wherein the first member and the second member are joined together to define a space arranged to retain fuel.

5. The fuel tank of claim 2, wherein the member includes a first member and a second member each made of an aluminum alloy which has been cast by high vacuum die-cast technique, and the first and second members are welded together.

6. The fuel tank of claim 1, wherein at least a portion of the fuel tank has a thickness of about 2.4 mm or less.

7. A transportation apparatus comprising the fuel tank of claim 1.

8. The fuel tank of claim 1, wherein the cast aluminum alloy is an Al—Si—Mg type alloy or an Al—Si—Cu type alloy.

* * * * *